United States Patent [19]
Umeki et al.

[11] Patent Number: 5,928,354
[45] Date of Patent: Jul. 27, 1999

[54] METHOD FOR A MICROCOMPUTER TO ACCESS AN INSTRUCTION CODE FROM MEMORY

[75] Inventors: Tsunenori Umeki; Hirohiko Inoue, both of Hyogo-ken, Japan

[73] Assignee: Mitsubishi Denki Kabushiki Kaisha, Tokyo, Japan

[21] Appl. No.: 08/357,551

[22] Filed: Dec. 16, 1994

Related U.S. Application Data

[63] Continuation of application No. 07/816,197, Jan. 2, 1992, abandoned.

[30] Foreign Application Priority Data

Sep. 1, 1991 [JP] Japan ................................. 3-012860

[51] Int. Cl.[6] ...................................................... G06F 9/38
[52] U.S. Cl. ............................. 712/205; 712/38; 711/138
[58] Field of Search ..................................... 395/800, 425, 395/550, 250, 375; 711/125, 138, 122; 712/205, 872, 38, 42

[56] References Cited

U.S. PATENT DOCUMENTS

| | | | |
|---|---|---|---|
| 3,964,027 | 6/1976 | Dalmasso | 340/172.5 |
| 4,635,194 | 1/1987 | Burger et al. | 395/375 |
| 4,796,175 | 1/1989 | Matsuo et al. | 395/375 |
| 4,942,518 | 7/1990 | Weatherford et al. | 395/800 |
| 5,201,041 | 4/1993 | Bohner et al. | 395/425 |

OTHER PUBLICATIONS

*IBM Technical Disclosure Bulletin,* "Multiple Directories for a Second Level of Storage," vol. 26, No. 8, Jan. 1984.

"On–Chip Cache Memory Gives Ps a Big–System Look," *Electronic Design,* Oct. 13, 1983.

*Primary Examiner*—Larry D. Donaghue
*Attorney, Agent, or Firm*—Townsend and Townsend and Crew LLP

[57] ABSTRACT

A memory access method in a microcomputer for a CPU to fetch an instruction code from a memory when an instruction queue buffer does not contain the instruction code, comprising the steps of fetching the instruction code from a high-speed memory directly to the CPU, if the instruction code is in the high speed memory, or fetching the instruction code from a low-speed memory to the instruction queue buffer, if the instruction code is in the low-speed memory, then fetching the instruction code from the instruction queue buffer to the CPU.

4 Claims, 6 Drawing Sheets

FOR SKIPPING

FOR NOT SKIPPING

WHEN ACCESSING INTERNAL MEMORY

INSTRUCTION CODE SKIPS INSTRUCTION QUEUE BUFFER

WHEN ACCESSING EXTERNAL MEMORY

INSTRUCTION CODE DOES NOT SKIP INSTRUCTION QUEUE BUFFER BUT IT IS TEMPORARILY STORED IN INSTRUCTION QUEUE BUFFER BEFORE FETCHED TO CPU.

BROKEN LINE: FLOW OF INSTRUCTION CODE

WHEN SKIPPING INSTRUCTION QUEUE BUFFER

INSTRUCTION CODE SKIPS INSTRUCTION QUEUE BUFFER

WHEN NOT SKIPPING INSTRUCTION QUEUE BUFFER

INSTRUCTION CODE DOES NOT SKIP INSTRUCTION QUEUE BUFFER BUT IT IS TEMPORARILY STORED IN INSTRUCTION QUEUE BUFFER BEFORE FETCHED TO CPU.

BROKEN LINE: FLOW OF INSTRUCTION CODE

METHOD FOR A MICROCOMPUTER TO ACCESS AN INSTRUCTION CODE FROM MEMORY

This is a Continuation of application Ser. No. 07/816,197, filed Jan. 2, 1992, now abandoned.

BACKGROUND OF THE INVENTION

1. Field of the Invention

The present invention relates to a microcomputer, especially to an access method for a CPU to access memories.

2. Description of the Prior Art

FIG. 6 is a block diagram showing the configuration of a conventional microcomputer related to this application. In FIG. 6, numeral 1 is a CPU (central processing unit), 2 is an instruction queue buffer for pre-fetching a command and temporarily store it, and 3 is an internal memory comprising a ROM or RAM.

The above CPU1, instruction queue buffer 2, and internal memory 3 are interconnected by an internal bus 4, composing a one-chip microcomputer 5. Meanwhile, numeral 6 is an external memory installed outside the microcomputer 5, which is connected to the internal bus 4 of the microcomputer 5 by an external bus 7. In general, the internal memory 3 is built in the microcomputer 5 and frequently accessed. Because the capacity of the memory 3 is limited, an expensive high-speed memory is used. The external memory 6 is connected with the microcomputer 5 by the external bus 7. Because the memory 6 requires a large capacity, an inexpensive low-speed memory is used.

Then, operations are described below.

The CPU1 executes an instruction by fetching the instruction code from the instruction queue buffer 2. In this case, unless the requested instruction code is present in the instruction queue buffer 2, the CPU1 skips the instruction queue buffer 2 to fetch the instruction code directly from the internal memory 3 or external memory 6 as shown by a dotted line independently of access to the internal memory 3 or external memory 6 in order to execute the instruction. Thus, memory access can be accelerated. FIG. 7 is a block diagram showing the configuration related to this application of other microcomputer according to the prior art. In FIG. 7, numeral 1 is a CPU, 2 is an instruction queue buffer, and 3a and 3b are internal memories. Number 3a is a high-speed memory comprising a DRAM or SRAM and 3b is a low-speed memory comprising an EPROM. The CPU1, instruction queue buffer 2, and memories 3a and 3b are interconnected by an internal bus 4, composing a one-chip microcomputer 5. Though the EPROM composing the above low-speed memory 3b is low-speed in view of its structure, it is frequently used for microcomputers as a reloadable nonvolatile memory.

The following is the description of the operation of the conventional embodiment.

The CPU1 executes an instruction by fetching the instruction code from the instruction queue buffer 2. In this case, unless the requested instruction code is present in the instruction queue buffer 2, the CPU1 skips the instruction queue buffer 2 to fetch the instruction code directly from the high-speed memory 3a or low-speed memory 3b as shown by a dotted line independently of access to the high-speed memory 3a or low-speed memory 3b in order to execute the instruction. Thus, memory access can be accelerated.

For the memory access method when the requested instruction code is not present in an instruction queue buffer in an conventional microcomputer, an CPU skips the instruction queue buffer to fetch an instruction code directly from the internal or external memory, or high-speed or low-speed memory independently of the high-speed memory such as an internal memory or low-speed memory such as an external memory in FIG. 6, or independently of the high-speed memory and low-speed memory of the internal memories of FIG. 7. Therefore, to fetch the instruction code from the low-speed memory such as an external memory or the internal low-speed memory such as EPROM, the instruction code may not be fetched an error may occur because of severe timing. The speed of a memory depends on the access performance peculiar to the memory element used. However, it is finally determined relatively to the speed of the CPU. Therefore, the above problem easily occurs nowadays because the CPU operation speed is greatly increased according to accelerated operation clock or the like.

SUMMARY OF THE INVENTION

The present invention is made to solve the above problem and it is an object of this invention to obtain a microcomputer with improved reliability without degrading the access performance for high-speed memories and by securely fetching instruction codes for low-speed memories unless the required instruction code is present in the instruction queue buffer.

For the memory access method of the microcomputer related to this invention in which a CPU accesses a memory through an instruction queue buffer to fetch the required instruction code from the instruction queue buffer for execution of instruction when the instruction code is present in the instruction queue buffer, the CPU judges whether the memory to access is a high-speed memory or low-speed memory unless the required instruction code is present in the instruction queue buffer and skips the instruction queue buffer to fetch the instruction code directly from the memory for a high-speed memory and waits for the instruction code to be fetched to the instruction queue buffer without skipping the instruction queue buffer for a low-speed memory.

This memory access method makes it possible to separately use the internal memory built in a microcomputer as a high-speed memory and the external memory connected to the outside of the microcomputer as a low-speed memory and also possible to use the internal memory built in the microcomputer as a high-speed memory comprising a DRAM or SRAM or as a low-speed memory comprising EPROM or the like.

For the present invention, unless the required instruction code is present in the instruction queue buffer, the CPU skips the instruction queue buffer when accessing the internal memory but does not skip it when accessing the external memory. Therefore, the access time can be saved especially to access the external memory and the instruction code can securely be fetched.

Also for the internal memory, it is possible to select whether or not to skip the instruction queue buffer according to the memory access performance. Therefore, the access time can be saved for the low-speed memory and the instruction code can securely be fetched.

DESCRIPTION OF THE PREFERRED EMBODIMENTS

Embodiments of the present invention are described below according to the drawings.

Figure 1A:
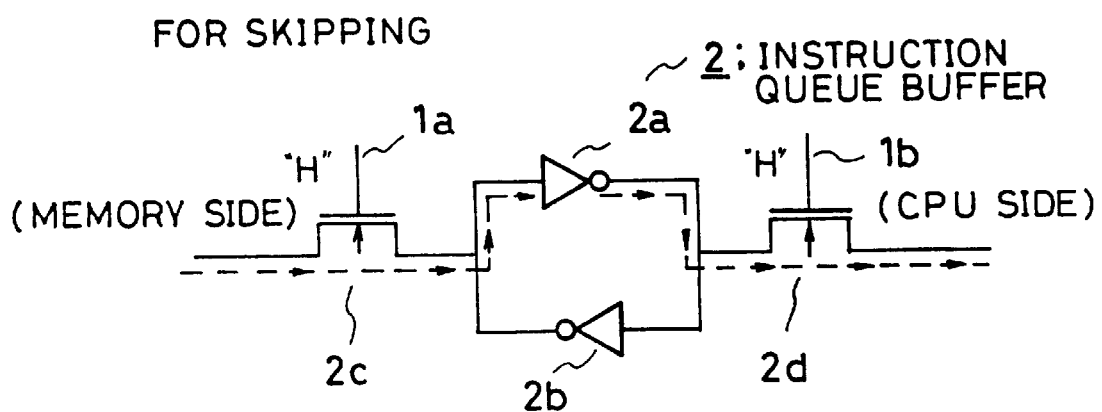
FIG. 1a and b are a simplified block diagram showing a basic configuration of the instruction queue buffer for realizing the present invention.
Figure 1B:
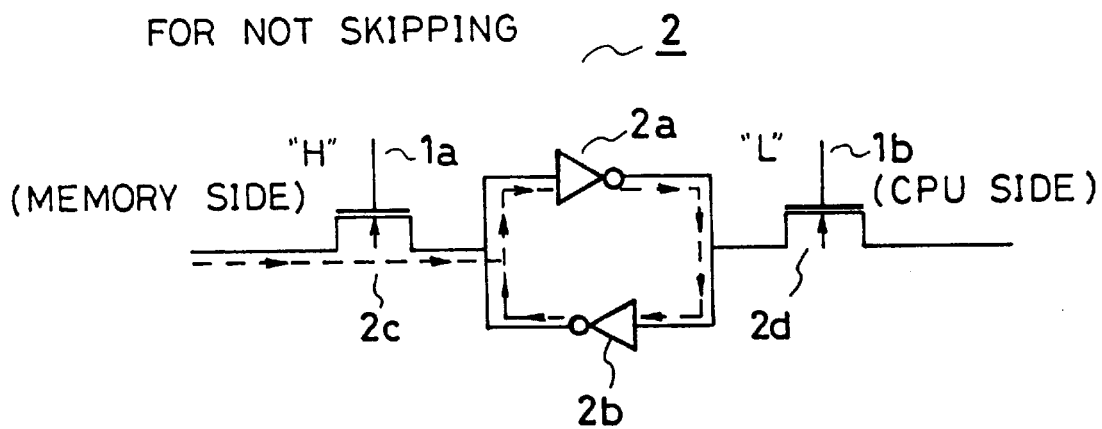
Figure 2:
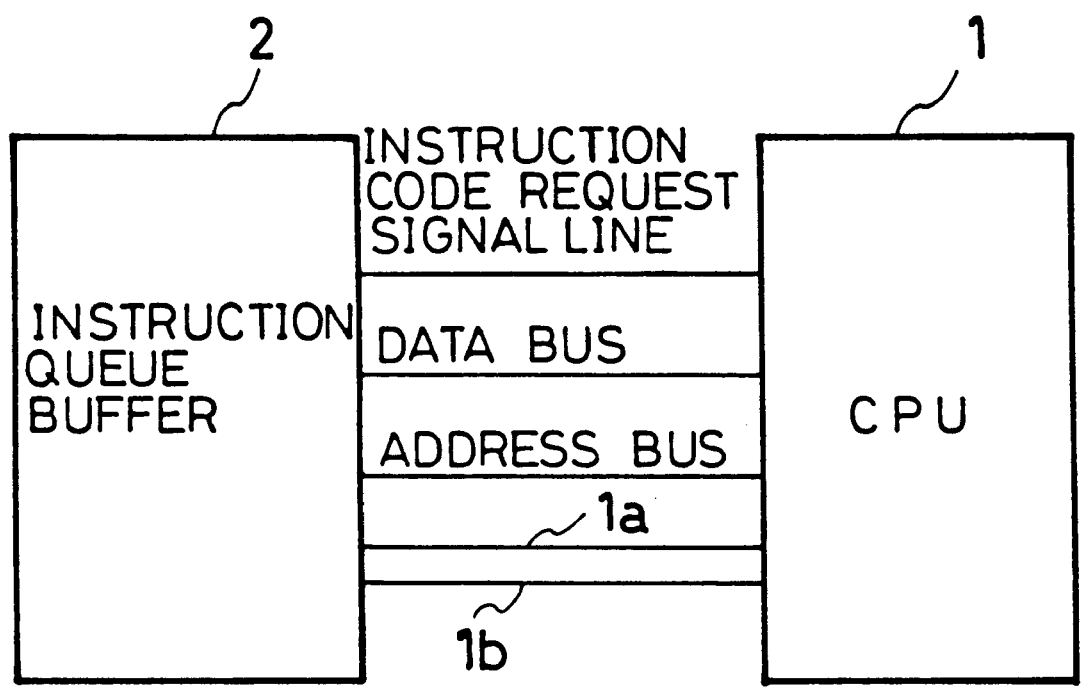
FIG. 2 is a connection diagram between the CPU and instruction queue buffer in FIG. 1.

First, a basic configuration necessary to realize the present invention is described. FIGS. 1(A) and 1(B) are simplified block diagrams showing cases where the CPU skips the instruction queue buffer 2 and does not skip it. FIG. 2 is a connection diagram between the CPU1 and instruction queue buffer 2.

In the figures, numerals 2a and 2b are buffers inversely connected in parallel whose memory and CPU sides connect with n-channel transistors 2c and 2d controlled by the CPU1 through the signal lines 1a and 1b respectively. The instruction queue buffer 2 consists of these parts corresponding to the bits of the internal bus 4. When the CPU skips the instruction queue buffer 2 as shown in FIG. 1(A), "H" level signal is applied from the CPU1 to the signal line 1a to turn on the transistor 2c and also to the signal line 1b to turn on the transistor 2d. Therefore, data skips the instruction queue buffer 2 as shown by a dotted line. Meanwhile, when the CPU does not skip the instruction queue buffer as shown in FIG. 1(B), "L" level signal is applied to the signal line 1b to turn off the transistor 2d through "H" level signal is applied to the signal line 1a to turn on the transistor 2c. Therefore, data is temporarily fetched to the instruction queue buffer 2 without skipping it as shown by a dotted line.

Figure 3:
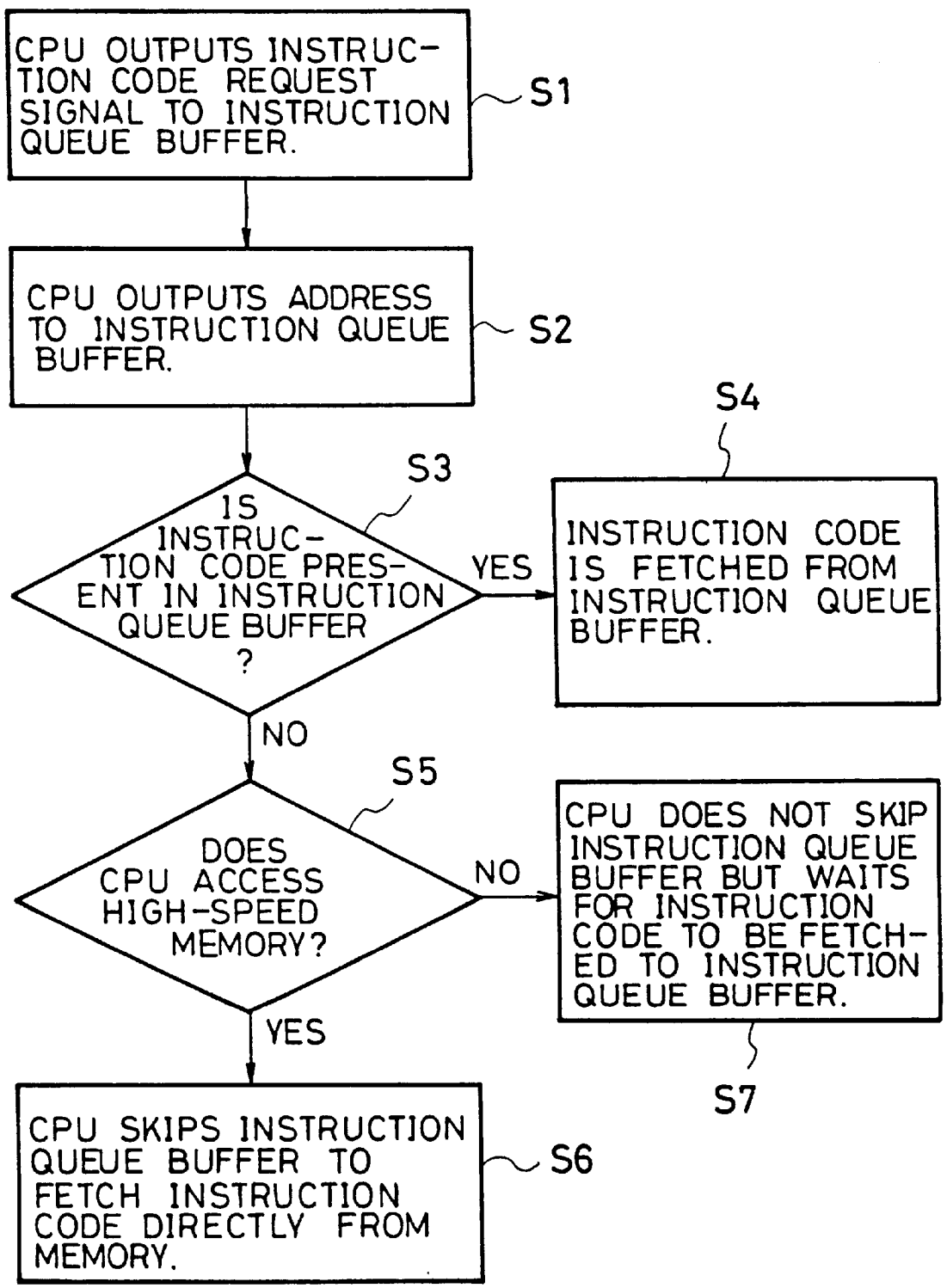
FIG. 3 is a flow chart showing the memory access method according to the present invention.

FIG. 3 is a flow chart showing the memory access method to be executed by the CPU1. First, the CPU1 executes an instruction by outputting the instruction code request signal to the instruction queue buffer 2 (step S1) and also the corresponding address (step S2). Then it checks if the requested instruction code is present in the instruction queue buffer 2 (step S3). If so, it fetches the instruction code from the instruction queue buffer 2 as usual (step S4). Unless the instruction code is present in the instruction queue buffer 2, the CPU1 judges whether to access the high-speed memory (step S5). When the CPU1 accesses the high-speed memory, it skips the instruction queue buffer 2 to fetch the instruction code directly from the memory as usual (step S6). Meanwhile, when the CPU1 accesses the low-speed memory, it waits for the instruction code to be fetched to the instruction queue buffer 2 from the memory without skipping the instruction queue buffer 2 (step S7). Moreover, whether to access the high-speed memory or low-speed memory can be judged by the addresses of the high-speed memory and low-speed memory arranged in the address space of the CPU1.

Figure 6:
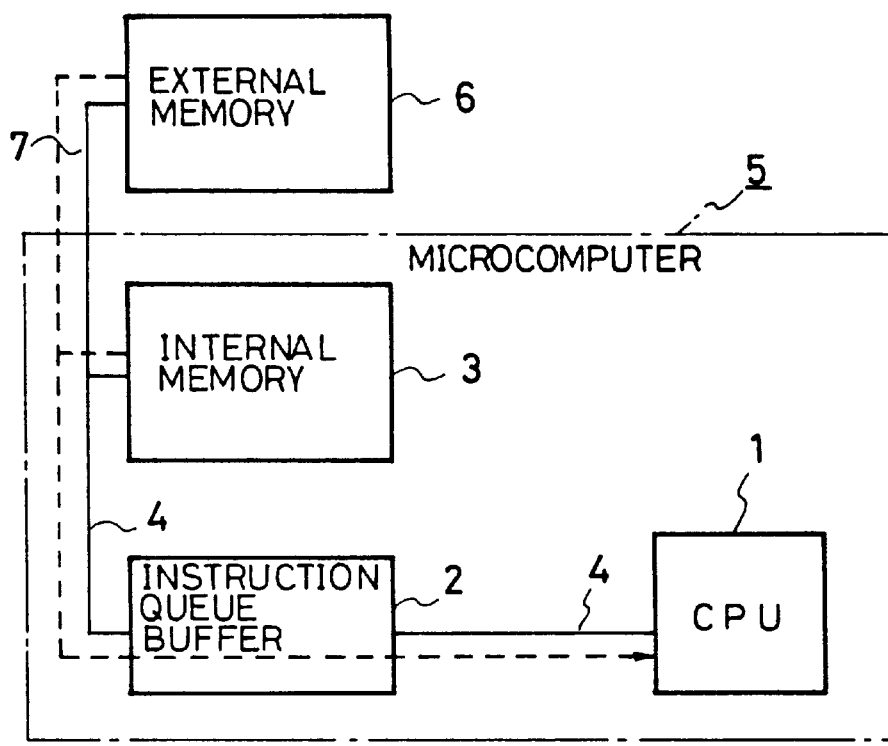
FIG. 6 is a main-portion block diagram of an conventional embodiment of microcomputer.

The following is the description of the operation when the present invention is applied to the conventional embodiment shown in FIG. 6, according to FIG. 4.

Figure 4A:
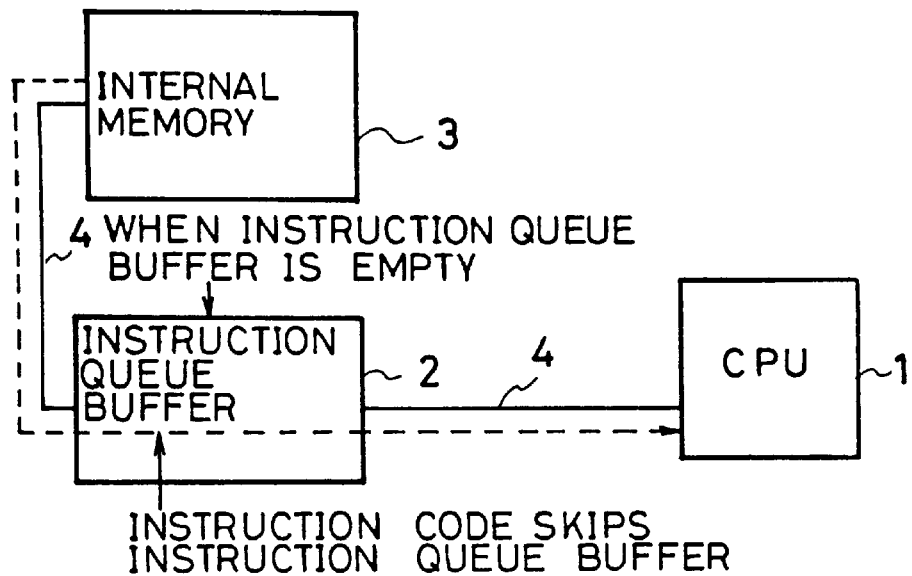
FIG. 4a and b are a view showing the operation of an embodiment according to the present invention.
Figure 4B:
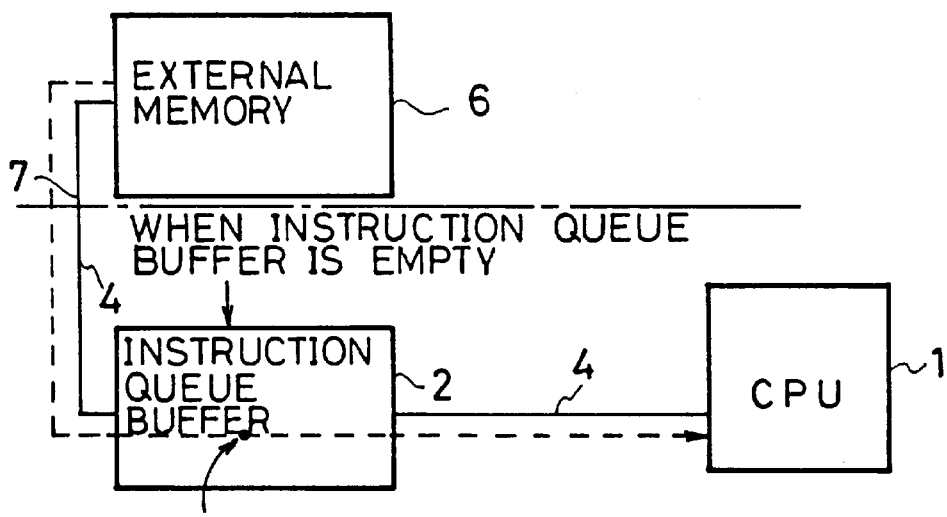

First, the case is described in which a high-speed memory such as an internal memory 3 is accessed. In this case, similarly to the conventional embodiment, the CPU1 skips the instruction queue buffer 2 to fetch the instruction code directly from the internal memory 3 to execute an instruction unless the instruction code is present in the instruction queue buffer 2 as shown in FIG. 4(A). However, when the CPU1 accesses a low-speed memory such as the external memory 6 and the requested instruction code is not present in the instruction queue buffer 2, the CPU1 temporarily stores the instruction code in the instruction queue buffer 2 and, one cycle later, fetches the requested instruction code from the instruction queue buffer 2 as shown in FIG. 4(B) unlike the above case of the internal memory 3 to pass through the instruction queue buffer. Thus, because the access time can be saved for the external memory 6, the instruction code is securely fetched and the reliability to access the memory is improved.

According to this embodiment, as mentioned above, it is possible to select the case of skipping the instruction queue buffer 2 or not skipping it according to whether to access the internal memory 3 or the external memory 6 unless the requested instruction code is present in the instruction queue buffer 2. Especially because the access time to access the external memory 6 can be saved, the instruction code is securely be fetched and the reliability to access the memory is improved. Thus, it is expected that the whole performance of the microcomputer system is improved. There is also an advantage that the timing for the external memory 6 can easily be set when designing a system using a microcomputer.

Figure 5A:
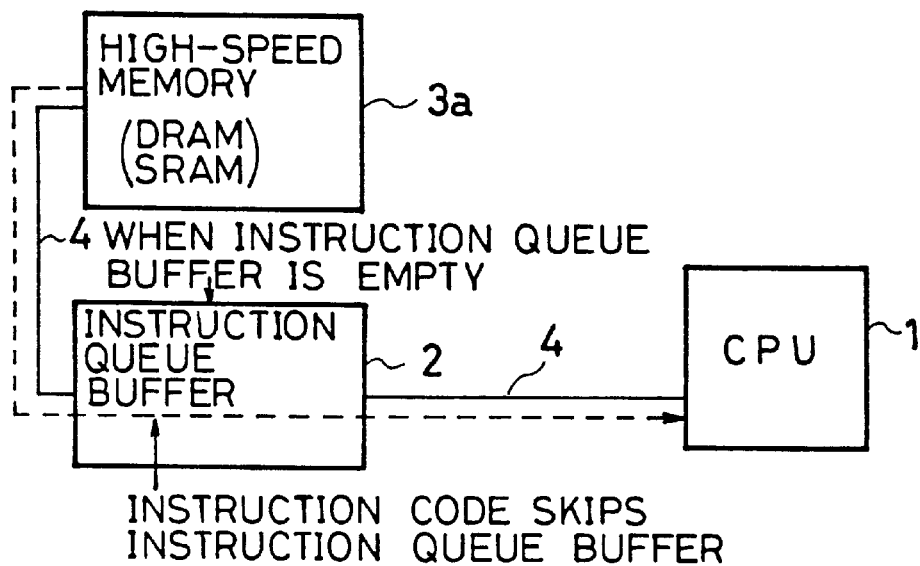
FIG. 5a and b are a view showing the operation of another embodiment according to the present invention.
Figure 5B:
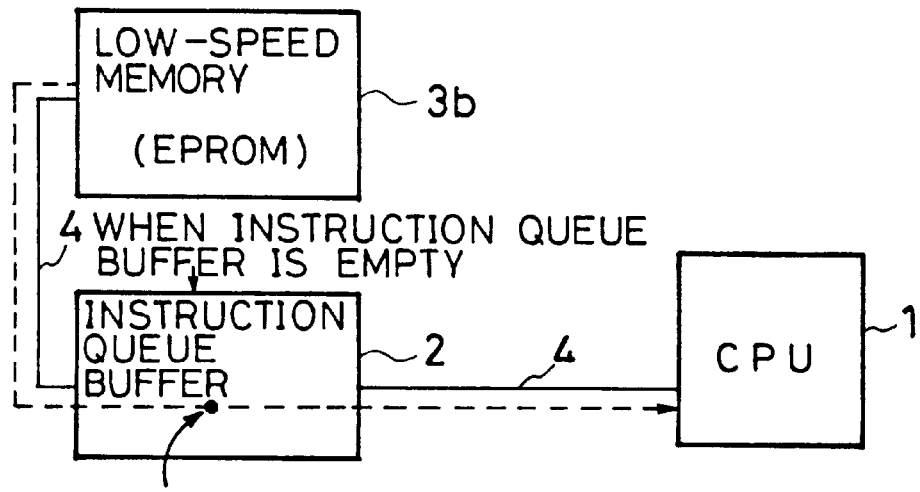
Figure 7:
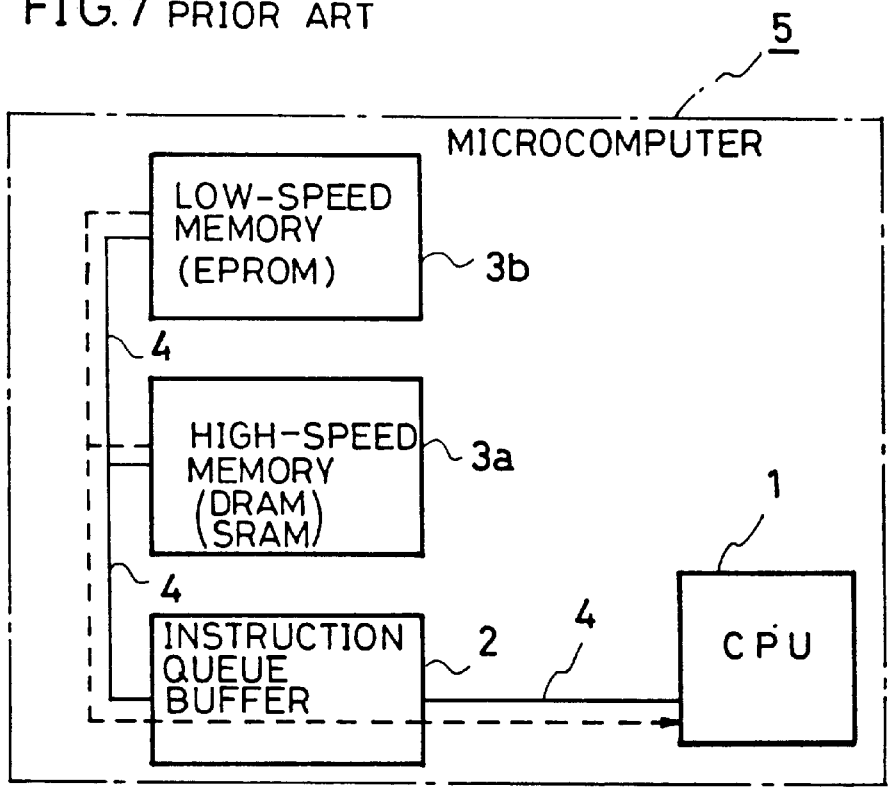
FIG. 7 is a main-portion block diagram of another conventional embodiment of microcomputer.

The following is the description of the operation when the present invention is applied to the conventional embodiment shown in FIG. 7, according to FIG. 5.

When the instruction queue buffer 2 is empty and the instruction queue buffer 2 is skipped to access the high-speed memory 3a such as a DRAM or SRAM, the CPU1 fetches the instruction code directly from the high-speed memory 3a by skipping the instruction queue buffer 2 to execute the instruction as shown in FIG. 5(A). However, when the instruction queue buffer 2 is empty but the instruction queue buffer 2 is not skipped to access the high-speed memory 3b such as EPROM, the CPU1 fetches the instruction code from the low-speed memory 3b. In this case, the CPU1 temporarily stores the instruction code in the instruction queue buffer 2 and, one cycle later, fetches the instruction code from the instruction queue buffer 2 to execute the instruction. Thus, by selecting the case of skipping the instruction queue buffer 2 or not skipping it according to the access performance of the internal memory, the instruction code is securely be fetched and the reliability to access the memory is improved.

According to this embodiment, as mentioned above, it is possible to select the case of skipping the instruction queue buffer 2 or not skipping it according to the access performance of the internal memory to be accessed unless the required instruction code is present in the instruction queue buffer. Especially because the access time to access the low-speed memory 3b such as EPROM can be saved, the instruction code is securely be fetched and the reliability to access the memory is improved. Thus, it is expected that the whole performance of microcomputer is improved. There is also an advantage that the timing for the low-speed memory 3b such as EPROM can easily be set when designing a microcomputer.

For the present invention as mentioned above, it is judged whether the memory to be accessed is a high-speed memory or low-speed memory unless the required instruction code is present in the instruction queue buffer when the CPU accesses the memory. When the memory to be accessed is a high-speed memory, the CPU skips the instruction queue buffer to fetch the instruction code directly from the memory. When the memory to be accessed is a low-speed memory, the CPU waits for the instruction code to be fetched to the instruction queue buffer without skipping the instruction queue buffer. Therefore, unless the requested instruction code is present in the instruction queue buffer, the instruction code is securely fetched from the low-speed memory without degrading the access performance for the high-speed memory and the reliability is improved. There is also the advantage that the timing can easily be set for design.

This memory access method makes it possible to separately use the internal memory built in a microcomputer as a high-speed memory and the terminal memory connected to the outside of the microcomputer as a low-speed memory, and also possible to use the internal memory built in the microcomputer as a high-speed memory comprising a DRAM or SRAM or a low-speed memory comprising an EPROM or the like.

What is claimed is:

1. In a microcomputer, a method for a central processing unit (CPU) to fetch an instruction code from a memory when an instruction queue buffer does not contain the instruction code, comprising the steps of:

fetching the instruction code from a high-speed memory directly to the CPU, if the instruction code is in said high speed memory;

fetching the instruction code from a low-speed memory to the instruction queue buffer, if said instruction code is in said low-speed memory;

waiting until said instruction code is fetched from said low-speed memory into said instruction queue buffer; and fetching the instruction code from the instruction queue buffer to the CPU, one cycle after the instruction code has been fetched from said low-speed memory to the instruction queue buffer.

2. A microcomputer memory system comprising;

a central processing unit (CPU);

an instruction queue buffer;

a high-speed memory;

a low-speed memory;

an internal microcomputer bus coupling said CPU to said high speed memory through said instruction queue buffer;

a first signal line coupling said CPU to a first transistor, said first transistor coupling said internal microcomputer bus to an input of said instruction queue buffer when said CPU asserts a first signal on said first signal line and decoupling said internal microcomputer bus from the input of said instruction queue buffer when said CPU deasserts said first signal on said first signal line;

a second signal line coupling said CPU to a second transistor, said second transistor coupling an output of said instruction queue buffer to said CPU when said CPU asserts a second signal on said second signal line and decoupling said output of said instruction queue buffer and said CPU when said CPU deasserts said second signal on said second signal line; and means for asserting both said first and second signals to bypass said instruction queue buffer when a first instruction to be fetched is accessed from said high-speed memory to fetch said first instruction directly to said CPU, for asserting only said first signal when a second instruction to be fetched is accessed from said low-speed memory to store said second instruction in said instruction queue buffer, and for asserting only said second signal after waiting for said second instruction to be stored in said instruction queue buffer to fetch said second instruction from said instruction queue buffer to said CPU.

3. The microcomputer memory system of claim 2 wherein said high-speed memory is internal to the microcomputer and said low-speed memory is external to the microcomputer.

4. The microcomputer memory system of claim 2 wherein said high-speed memory comprises a DRAM or a SRAM internal to the microcomputer and said low-speed memory comprises an EPROM internal to the microcomputer.

* * * * *